A. A. RUTTAN AND C. E. HUTCHINGS.
PLATE MAGAZINE FOR CAMERAS.
APPLICATION FILED MAR. 13, 1920.

1,399,884.

Patented Dec. 13, 1921.
6 SHEETS—SHEET 2.

Inventors
Alfred A. Ruttan
Charles E. Hutchings
BY
Frederick S. Church
their ATTORNEY A. A. RUTTAN AND C. E. HUTCHINGS.
PLATE MAGAZINE FOR CAMERAS.
APPLICATION FILED MAR. 13, 1920.

1,399,884.

Patented Dec. 13, 1921.
6 SHEETS—SHEET 6.

Inventors
Alfred A. Ruttan
Charles E. Hutchings
BY
Frederick D. Church
their ATTORNEY

UNITED STATES PATENT OFFICE.

ALFRED A. RUTTAN AND CHARLES E. HUTCHINGS, OF ROCHESTER, NEW YORK, ASSIGNORS TO EASTMAN KODAK COMPANY, OF ROCHESTER, NEW YORK, A CORPORATION OF NEW YORK.

PLATE-MAGAZINE FOR CAMERAS.

1,399,884.      Specification of Letters Patent.      Patented Dec. 13, 1921.

Application filed March 13, 1920. Serial No. 365,470.

*To all whom it may concern:*

Be it known that we, ALFRED A. RUTTAN and CHARLES E. HUTCHINGS, of Rochester, in the county of Monroe and State of New York, have invented certain new and useful Improvements in Plate-Magazines for Cameras; and we do hereby declare the following to be a full, clear, and exact description of the same, reference being had to the accompanying drawings, forming a part of this specification, and to the reference-numerals marked thereon.

Our present invention relates to photography and more particularly to magazine cameras and it has for its object to provide an improved magazine of large capacity but small bulk for shifting plates or cut films into and out of the field of exposure. Our invention is particularly adapted for use in aerial cameras, the improvements being directed in part toward eliminating the use of springs as far as possible in controlling the plates and in making the actuations thereof positive so that, for this and other reasons, the magazine will operate with equal facility in inverted and other positions. The improvements are further directed toward the provision of safety devices, making it impossible for the operator to inadvertently continue the shifting movements after the supply of unexposed plates has become exhausted and thus make a double exposure on one plate. To these and other ends the invention resides in certain improvements and combinations of parts all as will be hereinafter more fully described, the novel features being pointed out in the claims at the end of the specification.

In the drawings.

Similar reference numerals throughout the several views indicate the same parts.

As before indicated, our invention is particularly adapted to aerial cameras which, in use, have the axis of the lens vertical so that what is ordinarily referred to as the front of the camera becomes the bottom and the focal plane is horizontal instead of vertical. We will therefore, in the following description, infer this position of use designating, for instance, that which is ordinarily called the magazine back as the cover and so on.

To first give a general idea of the broad principles of design and operation that are involved, the magazine of the present embodiment comprises a casing provided with two plate holding chambers that are initially both filled to capacity with the unexposed or sensitive plates. The exposure opening, occupying the focal plane of the camera, is not located opposite either chamber, as is usually the case, but is at an intermediate point so that it is partially overlapped by both chambers. Shifting mechanism is employed which, through successive operations, causes the bottom plate in one chamber to move into register with the exposure opening for exposure; to move to the bottom of the pile in the other chamber; to work up through the pile in that chamber until transferred from the top of that pile back to the chamber from which it started and to then work down to its initial position at the bottom of the pile in that chamber. At this point, the shifting mechanism is positively locked against further actuation both through the medium of the plates themselves and by means of a latch that is automatically actuated by the counter mechanism at the conclusion of its cycle of movement. Both chambers being filled to capacity at all times, the plates remain in place whatever the position of the magazine.

Figures 14, 15, 16:
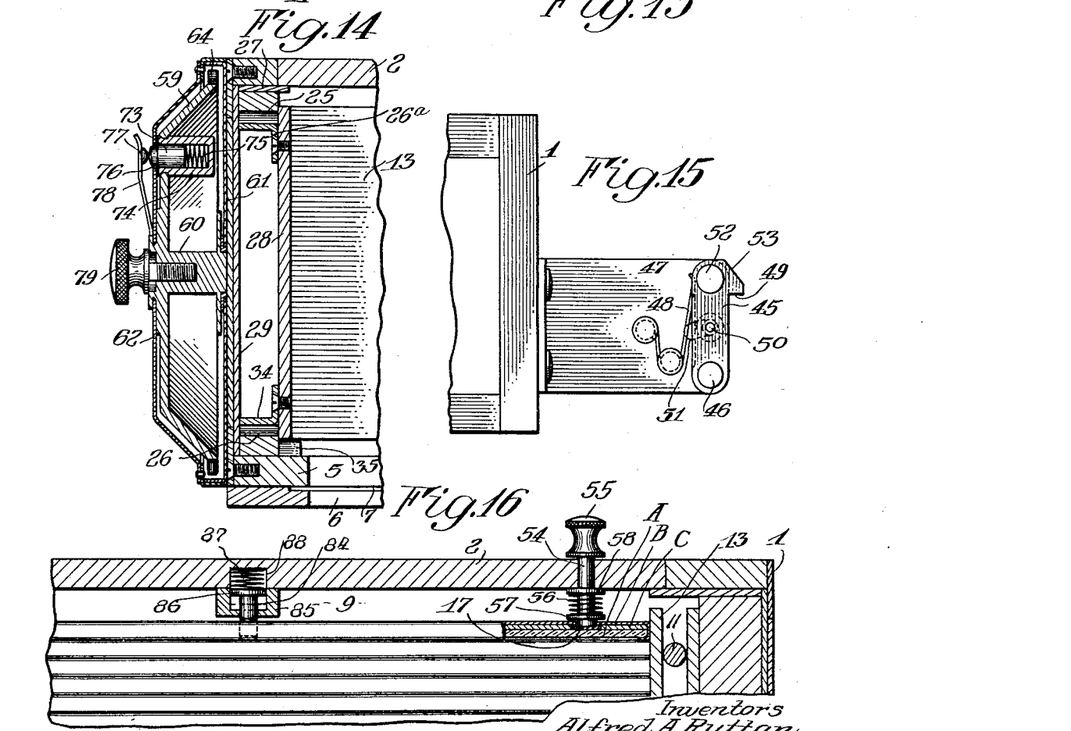
Fig. 14 is a fragmentary vertical section through the registering wheel taken substantially on the line 14—14 of Fig. 13.
Fig. 15 is a detail elevation of the arresting latch for the operating crank.
Fig. 16 is a detail enlarged fragmentary section taken transversely through the casing, cover and partially through one of the plate septums illustrating a plate locking device.

Plates prepared for use in magazines of this kind are usually mounted each in a separate metal septum or holder and referring more particularly to the drawings, and to Fig. 16 thereof, where a section of the plate and septum is shown, A indicates the glass plate and B the flanged metal septum provided with an intermediate backing C, but in the description we will refer, for convenience, to the septum and plate together merely as the "plate." Features of the invention could be utilized without recourse to the use of septums.

Referring now more particularly to Figs. 1, 2, 8 and 9, 1 indicates the outer end walls of the magazine casing, 2 the cover provided with handles 3 and locking bolts 4 of a type commonly used in this art and 5 the bottom provided with a central exposure opening 6, the rearward portion of which latter coincides with the focal plane of the camera to which the magazine is applied and which exposure opening may be sealed by a shutter (not shown) occupying a grooved guideway 7. The interior of the casing is divided into two plate chambers 8 and 9 separated by an intermediate wall or partition 10 that is preferably made hollow, as shown, to receive two transverse brace rods 11 and a central operating shaft 12 hereinafter referred to. The exposure opening 6 is not arranged opposite either chamber but intermediate the two so that it overlaps both and the partition 10 comes at about the center thereof. Inner metal lining walls 13 at the opposite ends of the chambers spaced from the main walls 1 of the casing conceal other transverse brace rods 14.

Figure 1:
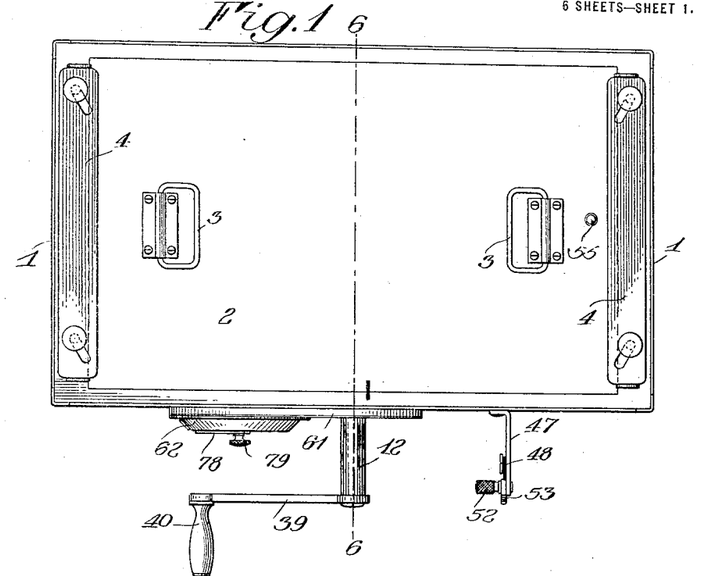
Figure 1 is a top view of a plate magazine constructed in accordance with and illustrating one embodiment of our invention.
Figure 2:
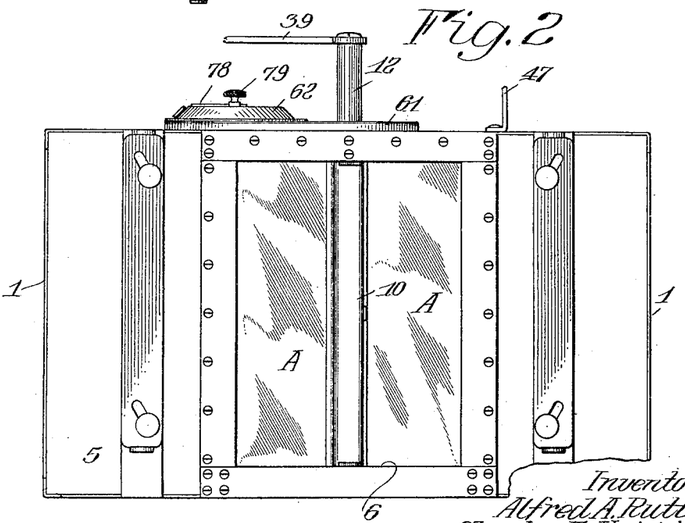
Fig. 2 is a bottom view thereof with the operating handle and other attachments broken away.
Figure 3:
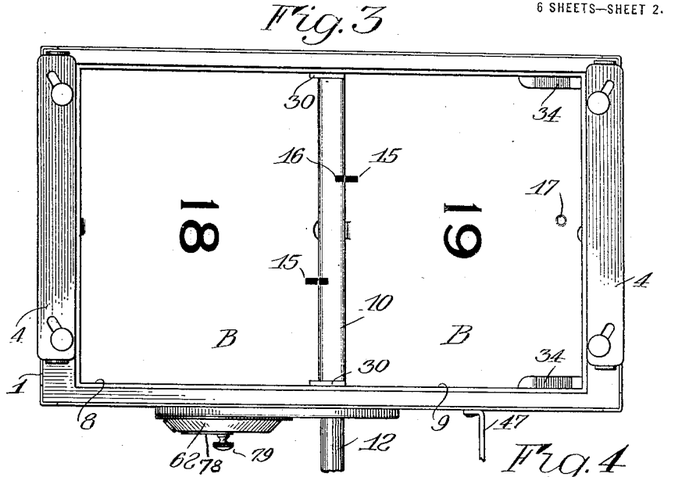
Fig. 3 is a top view with the cover or back removed and the operating crank and associated attachments broken away.
Figure 4:
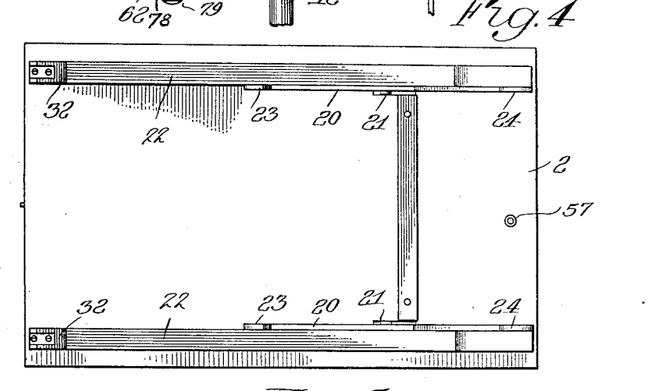
Fig. 4 is a bottom or inside view of the cover.

The capacity of the present magazine is thirty-six plates and, in the order of their exposure, they are arranged from 1 to 18 inclusive, in the chamber 8, counting from the bottom of the pile upwardly, and from 19 to 36, inclusive, in the chamber 9, counting from the top of the pile downwardly, plates 18—19 being on the tops of the two piles in the preliminary arrangement, as shown in Fig. 3. These plates are provided with distinguishing marks 15 adapted to register with corresponding marks 16 on their magazine or chamber walls as a check on the proper arrangement of the plates, and the plate 19 is provided with a locking recess or shoulder 17 for a purpose hereinafter explained.

Figure 8:
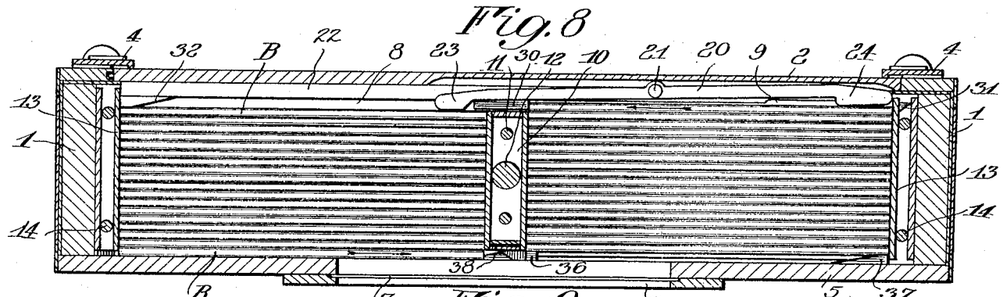
Fig. 8 is a longitudinal reduced section on the line 8—8 of Fig. 6 showing the magazine filled with plates and the parts in normal positions.
Figure 9:
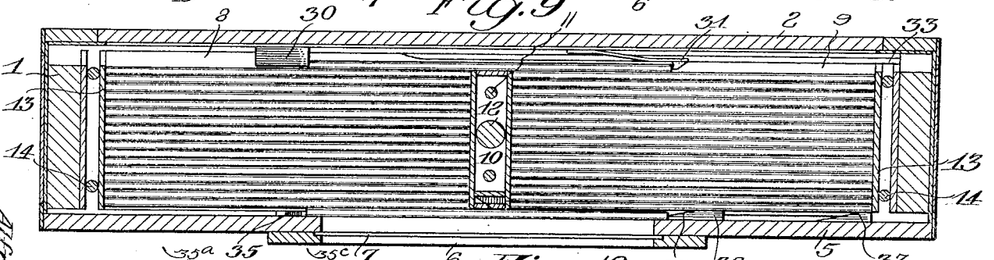
Fig. 9 is a similar view showing the positions of the parts when a plate is shifted to exposing position.

The cycle of movement, effected by mechanism about to be described and starting from the normal position of Fig. 8, transfers plate number 1 at the bottom of chamber 8 to the position over the exposure opening 6 shown in Fig. 9, in which position it spans the partition 10 and is half in the chamber 8 and half in the chamber 9. Simultaneously with such shifting of plate number 1, plate number 19 at the top of chamber 9 is moved in the opposite direction across the top of partition 10 so that it rests partly in the chamber 9 and partly in the chamber 8 directly above plate number 1 that is being exposed. After the exposure has taken place, completion of the plate shifting movement transfers plate number 1 from the exposure opening wholly into chamber 9 at the bottom of the pile. Said plate raises the pile to make room for itself and in this way, compensates for the removal of plate number 19 which has meantime been shifted entirely into chamber 8 to occupy the top of the pile and thrust that pile downwardly to compensate for the removal of plate number 1. In this way, both chambers are maintained tightly filled so that the plates cannot shake about and to assist in this and to positively feed the piles of plates, we employ followers 20 comprising levers pivoted at 21 to cleats 22 secured to the cover 2 on its under side. Each lever has two contact portions 23 and 24 spaced from each other a distance approximately equal to the length of a plate and located in their respective chambers 8 and 9 to engage near the edges of the respective piles of plates on corresponding sides of said piles. As the top plate leaves the chamber 9, the levers 20 are vibrated to the right so that contact member 24 lowers into engagement with the diminished pile and contact member 23 rises to take contact with the shifting plate which is received beneath it. As the pile in chamber 9 rises, after the full transfer of the plate, it vibrates the levers 20 to the left, forcing the pile of plates in chamber 8 to feed downwardly. It will be observed that no spring pressures are utilized.

Figure 6:
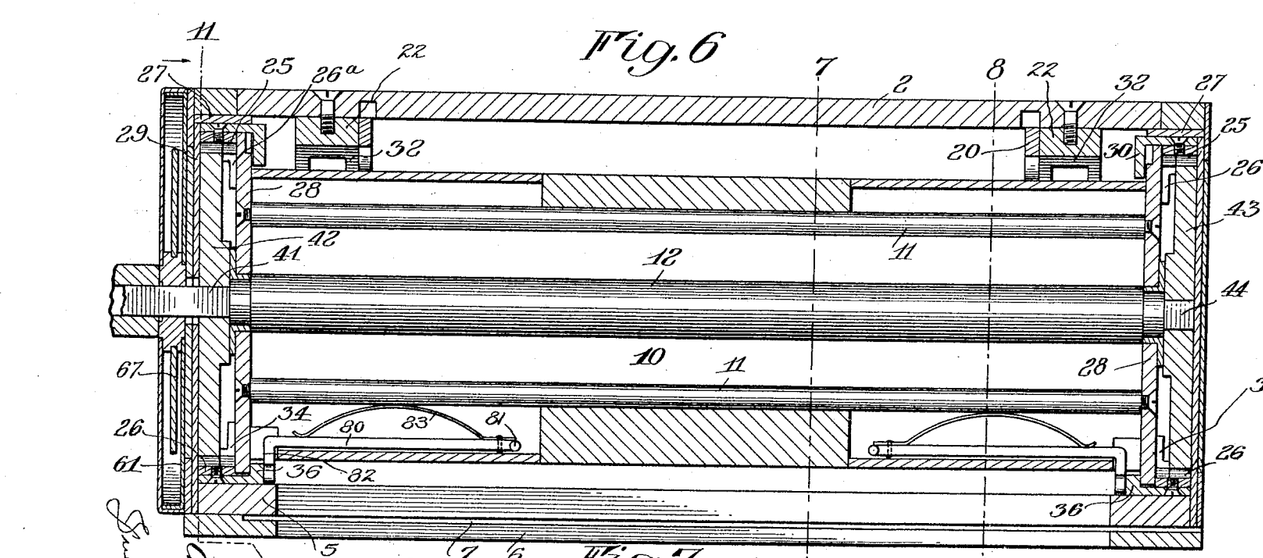
Fig. 6 is an enlarged transverse vertical section taken on the line 6—6 of Fig. 1 with the operating handle broken away.
Figure 7:
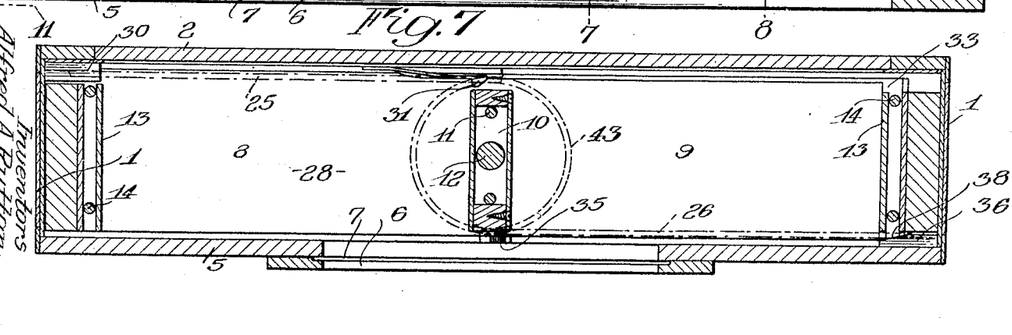
Fig. 7 is a reduced section on the line 7—7 of Fig. 6.
Figure 11:
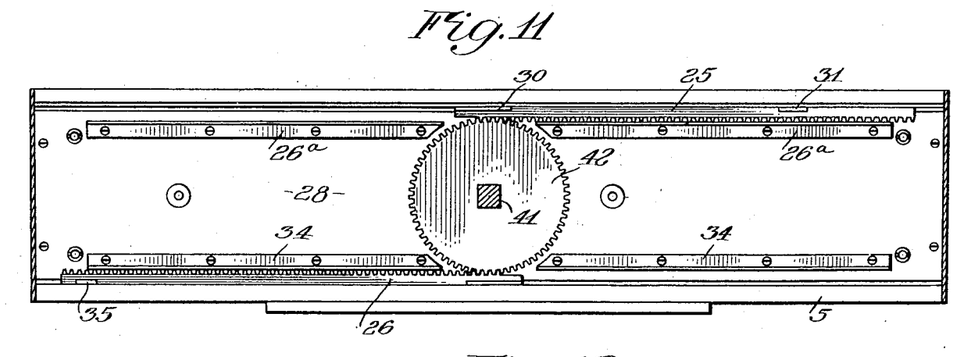
Fig. 11 is a longitudinal sectional view, reduced, taken substantially on the line 11—11 of Fig. 6 and looking in the direction of the arrows.
Figure 12:
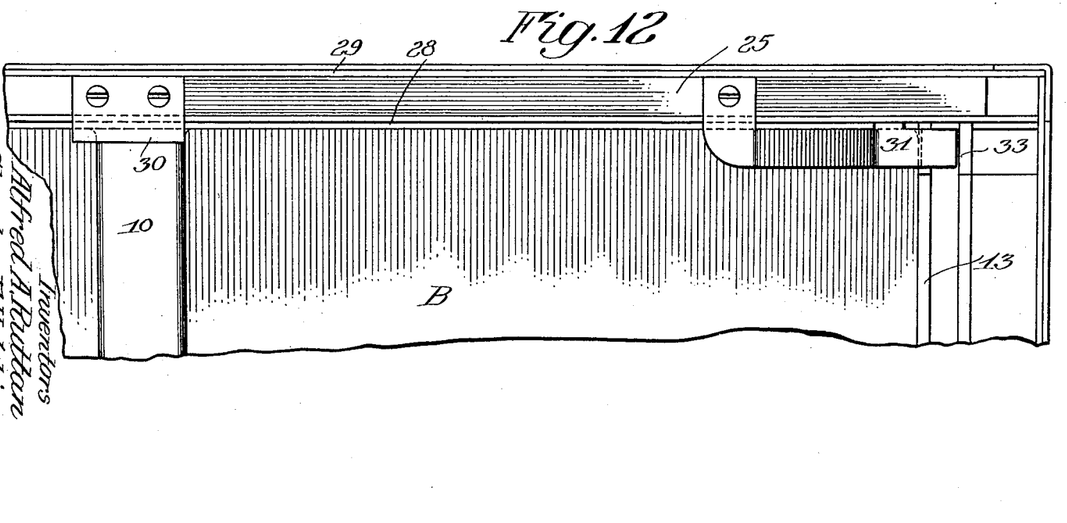
Fig. 12 is an enlarged fragmentary top view of one of the upper plate shifters showing the mode of engaging with a plate.

The mechanism for so simultaneously actuating two plates comprises a pair of shifters 25 at the top and a pair of shifters 26 at the bottom of the interior longitudinal corners of the casing. Referring to Figs. 6, 11 and 12, the upper shifters 25 consist of rack bars confined between bracket flanges 26$^a$ and way strips 27 of the casing 1 (on which way strips the cover 2 rests) and between inner and outer wall plates 28 and 29 of the casing on the former of which the bracket flanges 26$^a$ are secured. The end of each rack bar 25 that is in the chamber 8 has an offset finger 30 shown in Figs. 6 and 9 and also in Fig. 12 that coöperates with the front edge of the upper shifting plate, and an offset spring finger 31 at the opposite end adapted to engage automatically behind the topmost plate in chamber 9 and to force it along in its travel. When the top plate is completely shifted to the left into chamber 8, it is disengaged from the finger 30 by a cam surface 32, Fig. 8, that forces its advance edge downwardly against the pile of plates. The return of the shifter 25 causes the spring finger 31 to engage the next plate in chamber 9, a cutaway portion 33 in the wall of the chamber permitting it to run slightly beyond the pile and to snap into engagement with the edge of the succeeding plate.

Figure 10:
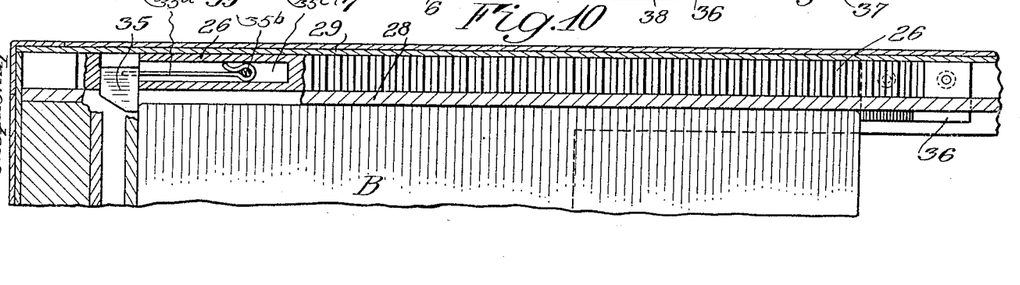
Fig. 10 is an enlarged fragmentary horizontal section showing one of the lower plate shifters and its mode of engaging with a plate.

The lower shifters 26 likewise consist of rack bars, as shown in Figs. 6, 10 and 11 that are confined between the bottom 5 of the casing and bracket flanges 34 on the inner wall plates 28. At the left hand end of each rack 26 is a laterally yielding spring catch 35 mounted (Fig. 6) upon a spring wire arm 35$^a$ looped about a pin 35$^b$ in a cavity 35$^c$ in a wall of the casing and this catch is adapted to project beneath the wall plate 28 and engages the rear edge of the lowermost plate in chamber 8, as shown in Figs. 8 and 10, to propel it into chamber 9. At the opposite end of each rack is a similarly projecting shouldered finger 36 that engages the advance edge of the said plate and when the latter has been pushed completely into plate chamber 9, it is raised out of engagement with the finger 36 by a cam block 37 that raises the plate and the pile of plates and permits the return of the shifter 26. The finger 36 is beveled at 38 to insure this disengagement and the block 37 is, of course, offset toward the center of the plate from the path of the finger 36. Retrograde movement of a plate once shifted from chamber 8 to chamber 9 is prevented by catches 80 pivoted at 81 within the partition 10 and having down-turned beveled ends 82 normally pressed into the path of the corners of the plate or septum by leaf springs 83 reacting against one of the brake rods 11.

The joint actuation of all of the shifters 25 and 26 is brought about through the common operating shaft 12 within the partition 10 and previously mentioned. This shaft extends to the exterior of the casing through the side wall and is fitted with a crank 39 having a handle 40. Between the wall plates 28 and 29 a squared portion 41 of the shaft carries a pinion 42 meshing with an upper shifting rack 25 and a lower shifting rack 26, while at the opposite end the pinion 43 on a squared portion 44 of the shaft, similarly meshes with the other two racks so that as the shaft is rotated to the left in Figs. 5 and 11, it will move the upper shifting racks to the left and the lower shifting racks to the right to bring about the previously described movements of the upper and lower plates illustrated in Figs. 8 and 9.

Figure 5:
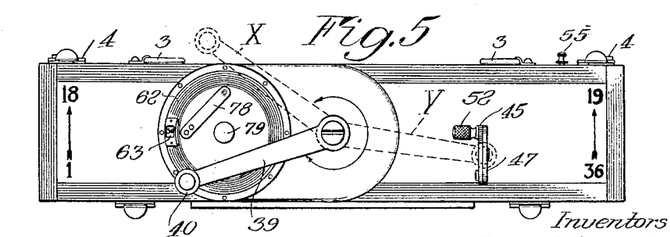
Fig. 5 is a side view.

The complete shifting movement of this operating mechanism to completely transfer a plate from each chamber into the other is effected when the crank 39 is moved counter clockwise from the full line to the dotted line position of Fig. 5 indicated at X. It is necessary, however, to arrest the crank in the dotted line position indicated at Y and render its movement intermittent in order to halt the lower plate for exposure in register with the opening 6, as shown in Fig. 9. For this purpose, I provide a releasable stop or spring latch indicated at 45 and best shown in Figs. 1, 5 and 15. It is pivoted at 46 to a bracket 47 secured to the side of the magazine casing and is normally thrust outwardly by its spring 48 so that a shoulder 49 thereon will be in the path of the crank. Such position is limited by a pin 50 working in an arcuate slot 51 in the bracket. Adjacent to the shoulder 49 that engages the lever or crank 39 to arrest it in the dotted line position Y, is an operating knob or handle 52. After the plate has been fed to exposing position and stopped there through the halting of the crank, and after the exposure has been made, the operator, with his hand on the crank handle 40, can conveniently release the latch 45 by pressing his thumb against the knob 52 and can complete the operative movement of the crank to complete the transfer of the lower plate. The crank is then returned in a clockwise direction to its initial full line position of Fig. 5, the shifters returning idly to their initial positions of Fig. 8 for the reasons previously explained, and the stop latch 45 for the crank yielding to permit the passage of the crank through the provision of a cam surface 53 thereon.

When plate number 36, initially occupying the bottom of the pile in chamber 9 which is the last plate to be exposed, has resumed its initial position of Fig. 8, all of the plates in both chambers must be removed for development as another actuation of the shifting mechanism would result in a reëxposure of plate number 1 that has returned to the bottom of the pile in chamber 8. All of the plates have returned to initial position, including plate number 19 at the top of chamber 9 and provided with the depression 17 before described. We use this plate to lock all of the plates and the shifting mechanism against further actuation through the provision of a locking pin or plunger 54, Fig. 16, extending through the cover 2 and terminating in an operating knob 55 on the exterior. A spring 56 surrounding the plunger between a collar 57 fixed on the latter and a sliding collar 58 abutting the inside of the cover, holds the plunger in locking engagement with the recess 17 whenever plate number 19 is in this position.

Figure 13:
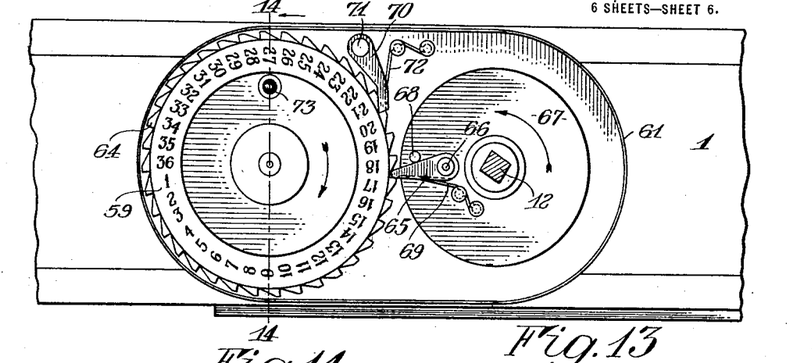
Fig. 13 is an enlarged sectional view taken transversely of the operating shaft and showing an elevation of the counting and registering mechanism, the cover plate of the casing for the latter being removed.

We also prefer to provide a counting and registering device, best shown in Figs. 6, 13 and 14. It consists of a registering wheel 59 on a hub 60 turning in a casing 61 and a cover plate therefor 62 secured to the exterior of the magazine casing adjacent to and on an axis parallel with the operating shaft 12. The face of the wheel bears numbers ranging, in the present instance, from 1 to 36, viewable successively through an opening 63 in the cover plate 62, as shown in Fig. 5. The periphery of the wheel is also formed with ratchet teeth 64 with which coöperates a pawl 65 pivoted at 66 on a disk 67 carried on the squared portion 41 of the operating shaft. The normal position of the disk and pawl is shown in Fig. 13, the pawl being in engagement with one tooth of the ratchet and held against the stop pin 68 by a spring 69. When the operating crank 39 is operated to shift a plate, the pawl, before leaving engagement with the ratchet tooth, turns the register one number and reëngages with the next tooth upon the return of the crank by yielding against the spring 69 away from the stop 68. Retrograde movement of the ratchet is prevented by a holding pawl 70 pivoted at 71 to the casing and held in engagement by a spring 72.

In connection with this registering mechanism, we prefer to provide additional means for locking the shifting mechanism at the conclusion of the operation of feeding and exposing the entire thirty-six plates. This consists of a locking plunger 73 occupying a socket 74 in the wheel 59 from which it is pressed outwardly by a spring 75 in the socket so that when the number 36 on the wheel registers through the opening 63, the plunger will automatically lock into an opening 76 in the cover plate 62. In doing so, it displaces a protuberant 77 on a spring finger 78 secured at 79 to the cover plate 62, the spring 75 being superior to the tension of the spring finger. The latter is utilized through a pressure of the thumb to similarly unlock the plunger 73 by pressing it back into the socket. The wheel may be independently turned for setting by a knob 79.

To prevent a topmost plate in chamber 9, once it is well started in the chamber 8 sufficiently to start the downward feed in the latter chamber, from being reversed we provide one or more locking plungers 84 on the under side of the cover 2. Each occupies a small casing 85 through which it projects and an enlarged portion 86 thereon is pressed downwardly by a spring 87 coiled in a cavity 88 in the cover 2. When the plate is fed beyond this point the plungers drop behind its rear edge and rest upon the next succeeding plate, which latter of course finally pushes it back again as it is fed upwardly.

We claim as our invention:

1. In a plate magazine for cameras, the combination with a casing embodying two plate chambers and an intermediate exposure opening partly in register with both chambers, of a shifter adapted to transfer a plate from one of said chambers into registry with the exposure opening.

2. In a plate magazine for cameras, the combination with a casing embodying two plate chambers and an intermediate exposure opening partly in register with both chambers, of a shifter adapted to transfer a plate from one of said chambers to the other and to halt it in an intermediate position in register with the exposure opening.

3. In a plate magazine for cameras, the combination with a casing embodying two plate chambers and an intermediate exposure opening, of a shifter adapted to transfer a plate from one of said chambers to the other and to halt it in an intermediate position in register with the exposure opening and means for transferring another plate from said receiving chamber back to the first mentioned chamber.

4. In a plate magazine for cameras, the combination with a casing embodying two plate chambers and an intermediate exposure opening, of a shifter adapted to transfer a plate from one of said chambers to the other and to halt it in an intermediate position in register with the exposure opening, means for transferring another plate from said receiving chamber back to the first mentioned chamber, and a common operating member for simultaneously so actuating both of said shifting means.

5. In a plate magazine for cameras, the combination with a casing embodying two plate chambers, a separating partition and an intermediate exposure opening opposite and arranged symmetrically with respect to the partition, of shifters adapted to simultaneously transfer plates in opposite directions from each chamber to the other at the opposite ends of stacks arranged in the two chambers, one of said plates passing into and out of register with the exposure opening.

6. In a plate magazine for cameras, the combination with a casing embodying two plate chambers and a shifter adapted to transfer plates from one chamber to the other, of a positively acting follower adapted to press against a pile of plates in one chamber and actuated by the pile of plates in the other chamber.

7. In a plate magazine for cameras, the combination with a casing embodying two plate chambers and a shifter adapted to transfer plates from a pile in one chamber to a pile in the other, of a follower embodying a rigid lever having two contact portions and an intermediate pivot and adapted to be vibrated positively by pressure from the recipient pile of plates in one chamber to exert pressure against the depleted pile of plates in the other.

8. In a plate magazine for cameras, the combination with a casing embodying two plate chambers and shifters adapted to simultaneously transfer plates in opposite directions from each chamber to the other at opposite ends of stacks arranged in the two chambers, of a follower embodying a rigid lever having two contact portions, one in each chamber, and an intermediate pivot, the contact portions being spaced to accommodate a shifting plate between them for successive engagement therewith and to be actuated by the positive vibration of the lever through the movement of one pile of plates against one of them as said pile is increased to press the other contact portion against said shifting plate and compress it against the other pile.

9. In a plate magazine for cameras, the combination with a casing embodying two plate chambers and provided with an exposure opening, and a plurality of plate carrying septums in the chambers, of a shifting mechanism adapted to carry the septums in succession from one chamber past the exposure opening, through the other chamber and back again, in rotation, and means for locking the shifting mechanism through the medium of one of the septums, said means being arranged to coöperate with said septum while the latter is in its initial position.

10. In a plate magazine for cameras, the combination with a casing embodying two plate chambers and provided with an exposure opening, and a plurality of plate carrying septums in the chambers, of a shifting mechanism adapted to carry the septums in succession from one chamber past the exposure opening, through the other chamber and a device on the casing adapted to automatically coöperate with a designated septum to lock the shifting mechanism when said septum has resumed its initial position.

11. In a plate magazine for cameras, the combination with a casing embodying two plate chambers and provided with an exposure opening and a plurality of plate carrying septums in the chambers, one of which is fitted with a locking recess, of a shifting mechanism adapted to carry the septums in succession from one chamber past the exposure opening through the other chamber and back again in rotation and a spring latch on the casing controllable from the exterior thereof and adapted to engage the locking recess in the said septum to halt the shifting mechanism when that septum has resumed its initial position.

12. In a plate magazine for cameras, the combination with a casing embodying two plate chambers and an intermediate exposure opening, of a shifting mechanism adapted to transfer a plate from one of said chambers past the exposure opening and into the other chamber, and a releasable latch for automatically halting the shifting mechanism when the plate is in register with the exposure opening.

13. In a plate magazine for cameras, the combination with a casing embodying two plate chambers and an intermediate exposure opening, of a shifting mechanism adapted to transfer a plate from one of said chambers past the exposure opening and into the other chamber and embodying an operating crank having a handle, and a releasable latch adapted to automatically engage said crank adjacent to its handle to temporarily halt the shifting mechanism when the plate is in register with the exposure opening and to restrict the crank to an intermittent operative movement.

14. In a plate magazine for cameras, the combination with a casing embodying two plate chambers and provided with an intermediate exposure opening, of a shifting mechanism adapted to carry the plates in succession from one chamber, past the exposure opening, through the other chamber and back again in rotation, a registering counter actuated by the shifting mechanism upon each cycle of its movement, and an automatic latch adapted to lock the counter and thereby lock the shifting mechanism when the last plate has returned to initial position.

15. In a plate magazine for cameras, the combination with a casing embodying two plate chambers and provided with an intermediate exposure opening, of a shifting mechanism adapted to carry the plates in succession from one chamber, past the exposure opening, through the other chamber and back again in rotation, a housing, a registering counter therein actuated by the shifting mechanism upon each cycle of its movement and an automatic latch adapted to lock the counter to the housing and thereby lock the shifting mechanism when the last plate has returned to initial position, said latch comprising a spring plunger on one of said members adapted to register with a socket in the other once upon each rotation of the counter.

ALFRED A. RUTTAN.
CHARLES E. HUTCHINGS.